United States Patent [19]

Nagano

[11] 3,772,932

[45] Nov. 20, 1973

[54] MULTI-SPEED TRANSMISSION FREE WHEEL FOR A BICYCLE

[76] Inventor: Masashi Nagano, c/o Shimano Industrial Co., Ltd., No. 77, 3-cho, Sakai, Japan

[22] Filed: Aug. 13, 1971

[21] Appl. No.: 171,526

[30] Foreign Application Priority Data

Dec. 30, 1970 Japan.............................. 45/141124

[52] U.S. Cl. ................................. 74/243, 74/217 B
[51] Int. Cl. ............................................. F16h 55/30
[58] Field of Search ....................... 74/217 B, 243 R

[56] References Cited
UNITED STATES PATENTS

| | | | |
|---|---|---|---|
| 3,661,021 | 5/1972 | Oshita............................... | 74/217 B |
| 586,991 | 7/1897 | Curley.............................. | 74/243 R |
| 3,478,614 | 11/1969 | Shimano .......................... | 74/243 R |

FOREIGN PATENTS OR APPLICATIONS

| | | | |
|---|---|---|---|
| 934,420 | 5/1948 | France ............................. | 74/217 B |

*Primary Examiner*—Leonard H. Gerin
*Assistant Examiner*—Frank H. McKenzie, Jr.
*Attorney*—Moonray Kojima

[57] ABSTRACT

In a multi-speed transmission free wheel to be provided on a wheel hub rotatably mounted on a wheel shaft of a bicycle are included a plurality of sprocket wheels respectively having a different number of teeth. Each tooth of said sprocket wheels has its peripheral portion that faces to a lowest speed transmission sprocket wheel and is notched in a manner that the foremost end thereof is deviated toward a highest speed transmitting sprocket wheel so that when the driving chain to be driven by treading the pedals, the shifting operation can be effected smoothly and exactly despite of a big difference in tooth number between said two sprocket wheels.

3 Claims, 7 Drawing Figures

INVENTOR.
MASASHI NAGANO
ATTORNEY

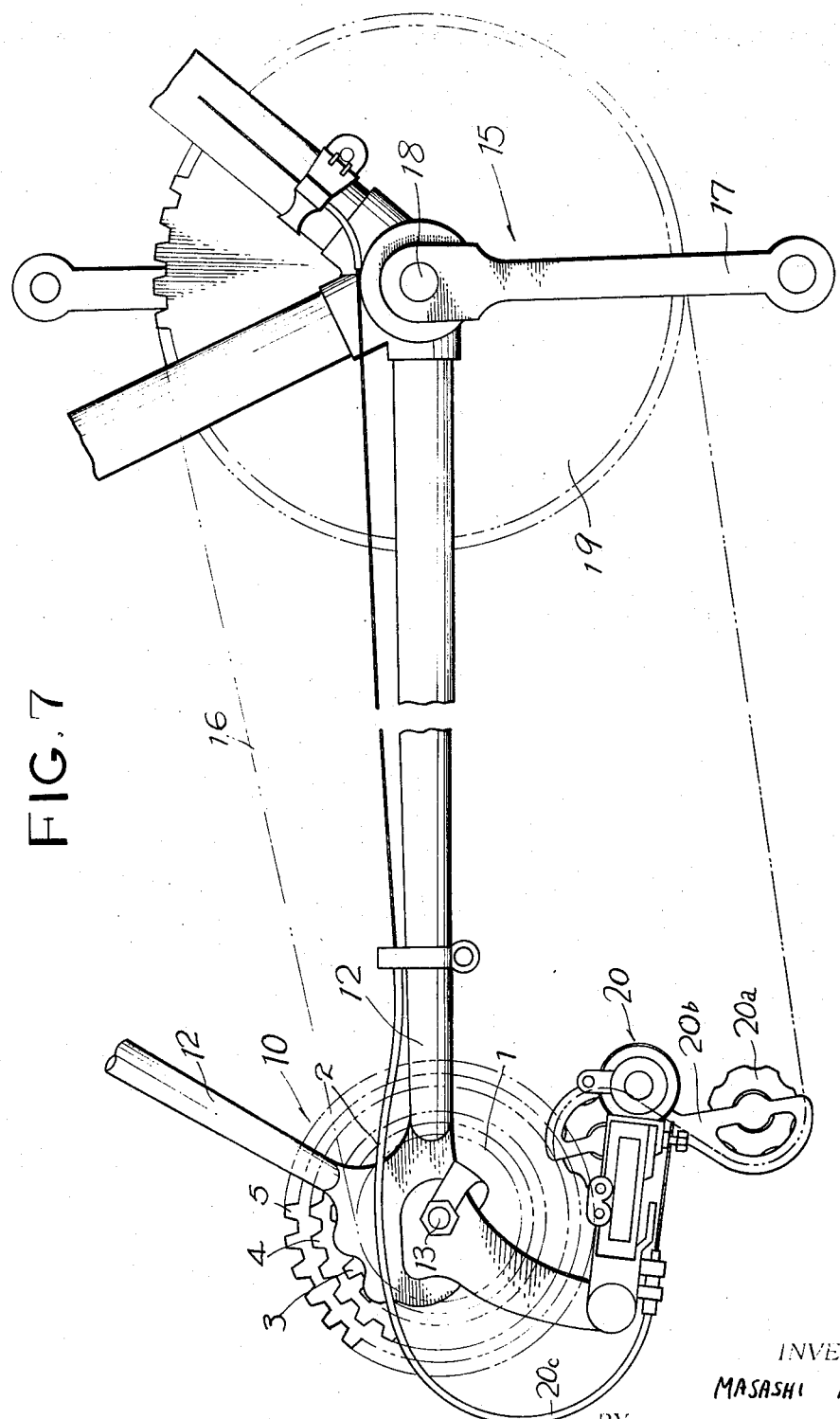

3,772,932

MULTI-SPEED TRANSMISSION FREE WHEEL FOR A BICYCLE

The present invention relates to the multi-speed transmission free wheel for a bicycle that comprises a plurality of sprocket wheels respectively having a different number of teeth, and more particularly it relates to such a multi-speed transmission free wheel that is provided on a wheel hub so mounted as to rotate about a shaft of the rear wheel and transmits multiple speeds to the wheel hub together with an externally housed gear-shifting system of a well-known type.

Conventionally it is a matter of common knowledge that a plurality of sprocket wheels respectively provided with a different number of teeth are mounted in a unidirectionally rotable manner on a wheel hub held on the shaft of a bicycle wheel, and one of these sprocket wheels is selected by an externally housed gear-shifting system mounted adjacent thereto, thereafter the driving chain to be driven by the pedals is engaged with the teeth of the sprocket wheel thus selected thereby rendering it to change the speed of a bicycle.

The above-mentioned type of externally housed gear-shifting system is provided with an induction wheel which holds the driving chain in an induceable manner and moves in the axial direction of the wheel hub so that the induction wheel is operationally moved in said axial direction and the driving chain held thereby is brought into engagement with one of the sprocket wheels disposed in said axial direction whereby the rotation of the wheel is changed in relation to the driving speed of the driving chain.

Referring to the sprocket wheels which is adapted for a multi-speed transmission free wheel and employed in combination with the above-mentioned externally housed gear-shifting system, the difference in tooth number between a maximum diameter sprocket wheel and a minimum diameter sprocket wheel has become so great in recent years that a maximum diameter sprocket wheel has, for example, thirtytwo teeth or as many as 34 teeth whereas a minimum diameter sprocket wheel has 14 teeth only. Moreover, such a difference is becoming greater and greater in the inversely geometrical manner.

The above-mentioned fact that a bigger difference in number between the teeth of the two sprocket wheels brings about a greater speed ratio is, on the one hand, sufficient enough to provide an advantage that a bicycle can be easily gear-shifted into any desired speed especially when being driven on a road or down along the incline, but being, on the other hand, accompanied with a disadvantage that the driving chain is not readily engageable with a sprocket wheel having selected teeth by movement of the aforesaid induction wheel so that no exact and prompt speed changing operation can be accomplished. In other words, the engagement of the driving chain is normally made on the side into which the chain comes to start engaging with a selected sprocket wheel so that, though the chain is forced on said side to move in the axial direction by means of the induction wheel, yet on the side from which the chain disengages out of an original sprocket wheel, it remains as engaged as ever with the latter sprocket wheel since there is no particular means to forcibly release the engagement of the driving chain with the latter sprocket wheel. The result is that the driving chain runs aslant as shown in FIG. 1 and may very often get twisted between said two sprocket wheels. This trouble is apt to take place generally in the case that the difference in tooth number between the maximum diameter sprocket wheel and the minium diameter sprocket wheel is exessively great and that said difference is increased in the inversely geometric series. Such a trouble will be more often experienced especially when the gear-shifting operation of the driving chain is made from the minimum diameter sprocket wheel directly to the maximum diameter sprocket wheel. The cocurence of trouble is attributable to the facts that firstly the driving chain is forcibly twisted when being gear-shifted as described above, secondly it is not engageable with a sprocket wheel just next to the minimum diameter sprocket wheel because it is spaced from the other intermediate sprocket wheels, and lastly it skates on said sprocket wheel partly because it is forcibly moved in the axial direction by means of the induction wheel even though it will move to said sprocket wheel and partly because the sprocket wheels of well-known types are generally provided on the edges of their teeth with only a few or none of holds.

The present invention has been devised to eliminate the above-mentioned disadvantages. Accordingly, an object of this invention is to provide a multi-speed transmission free wheel for a bicycle that is free from the above-mentioned disadvantages and can always effect the gear-shifting operation in a prompt and smooth manner. Another object of the invention is to provide a multi-speed transmission free wheel for a bicycle that is simple in structure, produceable in an easy manner and less expensive than the conventioal ones. Further object of the invention is to provide an improved type of multi-speed transmission free wheel for a bicycle, in which a difference in tooth number between a maximum diameter sprocket wheel and a minimum diameter sprocket wheel is made excessively great without limiting the number of teeth therebetween thereby producing an effective speed shifting ratio.

While an embodiment of the invention will now be described, by way of example, with reference to the accompanying drawings, the novel features and construction of the present invention are as defined in the appended claims.

Figure 3:
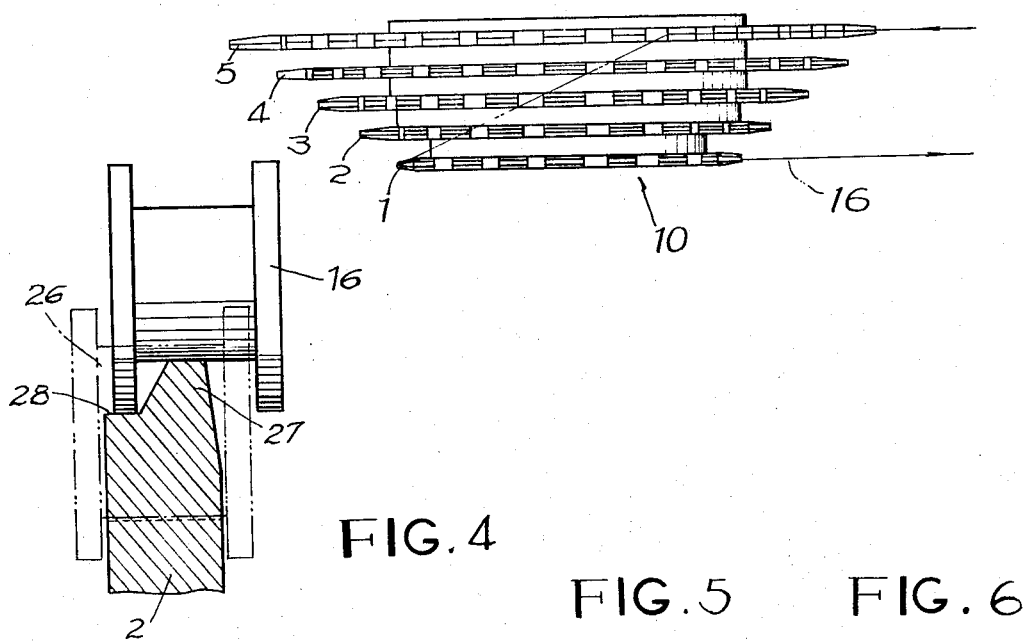
FIG. 3 is a plan view thereof.
Figures 4, 5, 6:
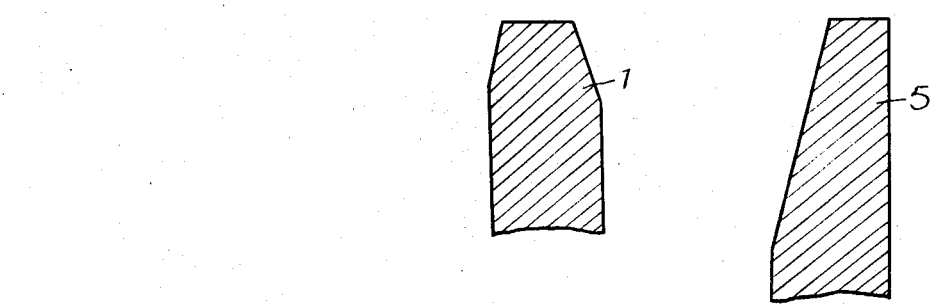

FIG. 4 showing is a cross-sectional view showing extensively the tooth portion of each sprocket wheel;

FIG. 5 is an enlarged vertical cross section showing a part of FIG. 3;

FIG. 6 is likewise an enlarged vertical cross section showing a part B of the same; and FIG. 7 is a front view partially showing a state where the free wheel mechanism embodying the invention is actually mounted on a bicycle.

In the present embodiment are applied 14 teeth to the first or minimum diameter sprocket wheel 1, 17 teeth to the second sprocket wheel 2, 20 teeth to the third or middle sprocket wheel 3, 24 teeth to the fourth sprocket wheel 4 and 28 teeth to the last or maximum diameter sprocket wheel 5.

Incidentally, each number of the teeth mentioned above may be changed as freely as desired in such a manner, e.g., that a greater speed ratio, if desired, is obtained merely by increasing the tooth number of the maximum diameter sprocket wheel 5. In addition, the piece number of said sprocket wheels if also freely changeable so that any desired piece number thereof can be selected in accordance with a desired speed transmission range. Thus it is not to be limited exclusively up to the five speed transmission free wheel described herein.

Figure 1:
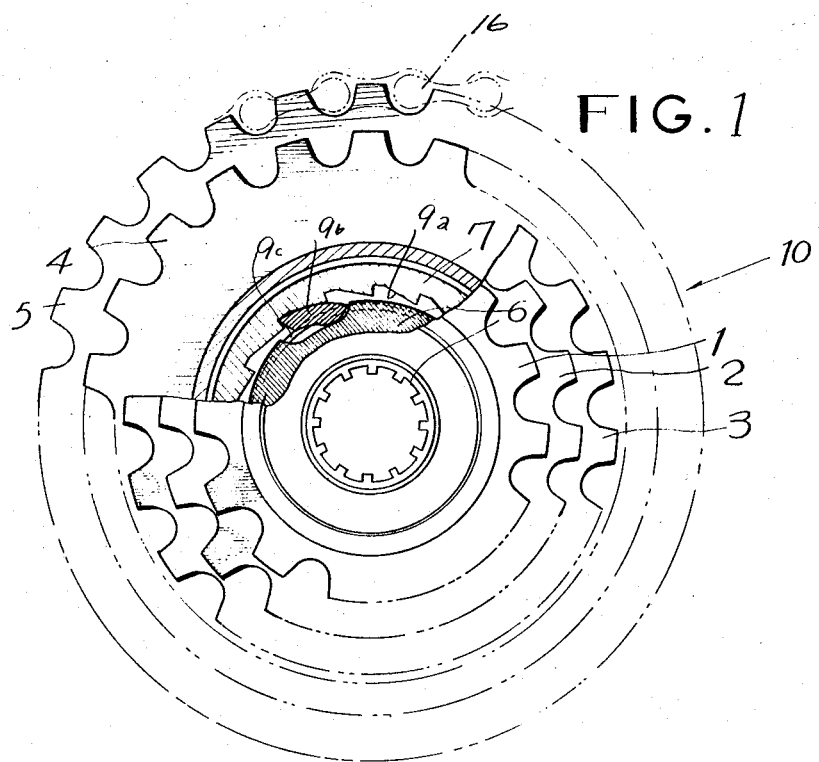
FIG. 1 is a front view showing an example of the multispeed transmission free wheel embodying the present invention.
Figure 2:
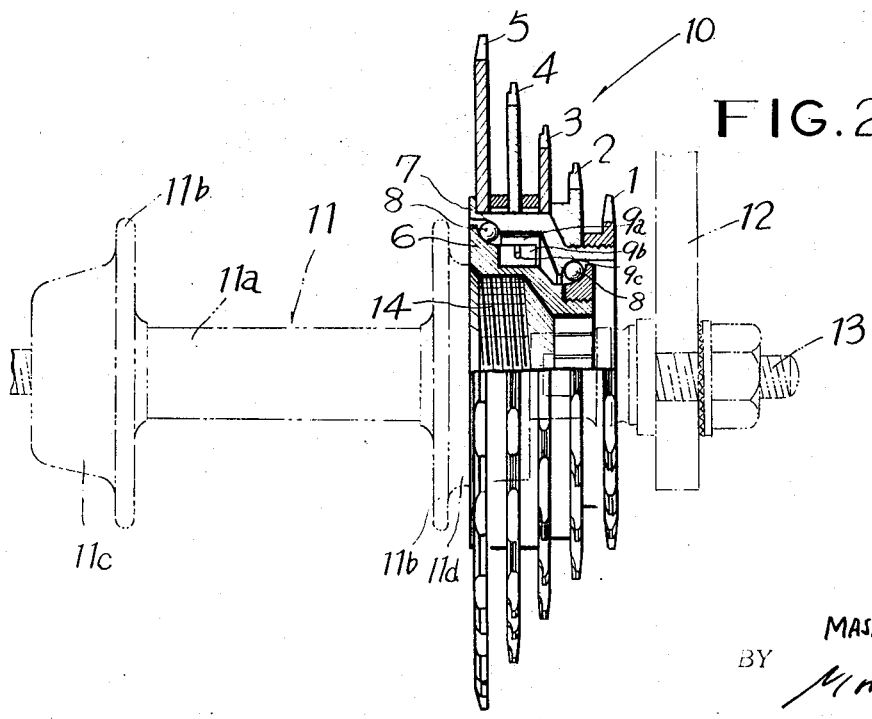
FIG. 2 is a vertical cross section taken on the line of 11 — 11 thereof.

As is clearly evident in FIG. 2, the free wheel 10 is adapted to be used by mounting the same on a rear hub 11 which is rotatably mounted on a hub spindle 13 secured to a bicycle frame member 12, comprising a cylindrical hub spindle portion 11a sleeved onto said hub spindle 13 and two opposed hub cones 11c, 11d respectively including flange b (not shown) for supporting one end of each spoke. On the outer periphery of the hub cone 11d (at the right in FIG. 2) are formed screw means through which the free wheel 10 is to be fixedly mounted to the hub cone 11d. The free wheel 10 to be mounted to the rear hub 11 in the above-mentioned manner consists of a driven member 6 having tapped portions 14 engageable with said screw means provided on the outer periphery of the hub cone 11d, a driving member 7 sleeved to the outer periphery of said driven member 6 at regularly spaced apart intervals, said plurality of sprocket wheels 1 to 5 to be secured to the outer periphery of said driving member 7 in equally spaced relation, a ball 8 interposed between said members 6 and 7 for rotating them in relative direction, and a ratchet mechanism 9 for transmitting from the driving member 7 to the driven member 6 the forward driving force only that is transmitted from any selected one of said sprocket wheels 1 to 5.

Said ratchet mechanism 9 cmprises a pawl member 9a which is forced in the intermediate inner peripheral portion of said driven member 6 in such a position as to correspond to said pawl member 9a, being normally pressed to engage therewith by means of a ring spring 9c.

When the driving member 7 rotates in the forward driving direction, the force thereof is transmitted to the driven member 6 through means of said pawl members 9a and 9b engaged with each other, whereas when the driving member 7 rotates in the rearward driving direction, the force thereof is not transmitted to the driven member 6 since pawl pawl member 9b skates on the pawl member 9a. Therefore, it is understood that when the force of driving a bicycle in the forward direction is transmitted to the driving member 7 to thereby move the same, the driven memer 6 is also moved in synchronism through said ratchet mechanism 9 whereby the rear wheel is rotated through the spokes secured to the rear hub 11, thus resulting in driving the bicycle.

The rotary movement of the driving member 7 is made possible by a driving mechanism portion 15 which is driven by the actuation of pedals (not shown) and a driving chain 16 which engages with any selected one of the sprocket wheels 1 to 5 secured to the drivng member 7 and transmits the driving force of said driving mechanism 15 to said selected sprocket wheel as shown in FIG. 7.

Said driving mechanism portion 15 comprises a pair of cranks 17 which respectively have their foremost ends provided with a pedal and a front gear 19 which is secured to crank shaft 18. Between said front gear 19 and said selected sprocket wheel there is extended the driving chain 16. Thus if the cranks 17 are rotated by treading the pedals, the front gear 19 is rotated to move the driving member 7 through the driving chain 16 and said selected sprocket wheel.

In order to engage the driving chain 16 with any selected one of said sprocket wheels 1 to 5, use is made of such an externally housed gear-shifting sprocket 20 as is shown in FIG. 7. Said system 20 is mounted externally of the free wheel 10 on one end of the hub spindle 13 secured to the bicycle frame member 12 and comprises an induction wheel 20a which is movable in parallel to the axial direction of the hub spindle 13, a moving element 20b which is provided with a pantograph means for moving said induction wheel 20a in parallel direction and a wire operating mechanism 20c which consists of a release wire for moving said moving element 20b.

Said system 20 is used by extending the driving chain 16 on the induction wheel 20a, in which the latter wheel 20a is moved through the moving element 20b by the operation of the wire operating mechanism 20c whereby the driving chain 16 extended on the induction wheel 20a is induced toward said plurality of sprocket wheels 1 to 5 to engage with any desired one thereof.

The above-mentioned free wheel 10, the use and operational conditions thereof are all conventionally well known and devoid of novel features.

According to the present invention, said free wheel 10 consists of the sprocket wheels 1 to 5 of which, excepting the minimum diameter sprocket wheel 5, the intermediate sprocket wheels 2 to 4 are all provided with such tooth edges as shown extensively in FIG. 4 for the purpose of clarity.

For a fuller understnding, there are formed notches 26 on the peripheral portions of the tooth edges of the sprocket wheels 2 to 4 which face to the side where speed is to be reduced, that is, to the maximum diameter sprocket wheel 5. The notched tooth edges are substantially inclined to the side where speed is to be increased, that is, toward the minimum diameter sprocket wheel 1, and the inner position of each inclined tooth edge 27 is formed to be a levelled portion 28.

While reference has been made in the above embodiment to the three sprocket wheels 2 to 4 arranged in the intermediate positions, such a construction is also possible for the sprocket wheels 1 and 5 arranged on both sides.

The sprocket wheels 1 to 5 located on both sides of the intermediate sprocket wheels 2 to 4 are located in the terminal positon for the driving chain 16 when it is gear-shifted so that they need not be formed into the shape as above mentioned, but may be formed into such a shape for example as shown in FIGS. 5 and 6. Thus when the driving chain 16 is to be gear-shifted from the sprocket wheel 1 onto the sprocket wheel 5 by the operation of the externally housed gear-shifting system 20, it is moved to the sprocket wheel 5 at the side into which it comes; but on the other hand, it will still stay on the sprocket wheel 1 at the side from which it goes out so that the driving chain 16 is forced to run aslant as shown in FIG. 3. However, the tooth ends of the second minimum diameter sprocket wheel 2 located next to said sprocket wheel 1 being formed into the above-mentioned shape, the driving chain 16 running aslant is exactly detained by these deviated tooth ends 27 and brought into engagement with the second sprocket wheel 2 without skating thereon. In other words, said tooth ends of the sprocket wheel 2 are engageable with the first sprocket wheel 1 all the more readily because they are substantially deviated toward the latter sprocket wheel 1 so that they can promptly and exactly engage with the driving chain 16.

Due to this engagement of tooth ends, the driving chain 16 that will retain its position on the first sprocket wheel 1 is forcibly dragged into the second sprocket wheel 1 and moved in the axial direction thereof. Then, the driving chain 16 is moved therefrom to the similarly tooth-shaped sprocket wheels 3 and 4, one after another, until it reaches the last or minimum diameter sprocket wheel 5 thereby making it possible to effect the gear-shifting operation of the driving chain 16 from a high speed into low.

Likewise, the operation of shifting the driving chain from a low speed into high is easily accomplished merely by moving said chain from the last sprocket wheel to the first sprocket wheel via the intermediate sprocket wheels. To be more precise, the driving chain 16 is firstly put on the levelled portion 28 of the psrocket wheel 4, secondly on that of the sprocket wheel 3 and thirdly on that of the sprocket wheel 2 in turn, thereafter being brought into engagement with the deviated tooth edges 27 of these sprocket wheels in the same order that it has been put thereupon.

Therefore, it is to be noted that the multi-speed transmission free wheel in accordance with the present invention can effect a prompt and smooth gear-shifting operation of the driving chain into any desired speed rate thereby attaining the purposes of eliminating all the deficiencies that are conventionally caused by the retardation of the speed changing operation and effecting the safe and exact speed changing operation of a bicycle.

It is believed that many advantages of a multi-speed transmission free wheel embodying the present invention will be readily understood, and although preferred embodiments are as illustrated and described, it is also to be noted that further modifications and arrangement of parts may be resorted to which will fall within the purview of the invention as claimed.

What is claimed is:

1. A multispeed transmission free wheel for a bicycle to be mounted on a wheel hub rotatably supported on a wheel shaft comprising
    a. a driven member secured to one end of said free wheel and rotatable along with said free wheel;
    b. a cylindrically shaped driving member sleeved on the outer periphery of said driven member at regularly spaced apart intervals, and rotatable in one direction with respect to said driven member while being rotatable in the other direction integrally therewith;
    c. a driving force transmitting mechanism for transmitting the force of said driving member in the space between said driven member and said driving member; and
    d. a plurality of different dent numbered sprocket wheels rigidly fixed on the outer periphery of said driving member at regularly spaced apart intervals, comprising addenda of each sprocket wheel opposed to a greater dent-numbered lower speed sprocket wheel are cut aslant from the outer periphery toward the radius thereof so as to form a flank face deviated toward a less dent-numbered, higher speed sprocket wheel, further said addenda being cut at a right angle with the axis thereof so as to form each flat surface area defining a notched portion with said deviated flank face.

2. The arrangement of claim 1, wherein at least one of the sprocket wheels between the highest and lowest speed sprocket wheels is provided with dents whose addenda are formed as set forth in item (d) of claim 1.

3. The arrangement of claim 2, wherein the addenda of said maximum dent-numbered, lowest speed sprocket wheel opposing to higher speed sprocket wheels are cut aslant with respect to the axis of said sprocket wheel.

* * * * *